(12) United States Patent
Lin

(10) Patent No.: US 7,657,832 B1
(45) Date of Patent: Feb. 2, 2010

(54) CORRECTING VALIDATION ERRORS IN STRUCTURED DOCUMENTS

(75) Inventor: William Lin, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 457 days.

(21) Appl. No.: 10/665,156

(22) Filed: Sep. 18, 2003

(51) Int. Cl.
G06F 17/00 (2006.01)

(52) U.S. Cl. .................. 715/234; 715/235; 715/237

(58) Field of Classification Search .................. 715/513, 715/511, 514, 516, 530, 200, 228, 234, 235, 715/237, 238, 273, 274, 713, 760, 201, 204, 715/205, 207, 209, 236, 239, 243, 248, 249, 715/253, 254, 255, 256, 257, 853, 854; 707/1, 707/10, 100, 200

See application file for complete search history.

(56) References Cited

U.S. PATENT DOCUMENTS

| | | | |
|---|---|---|---|
| 5,629,846 A | 5/1997 | Crapo | |
| 5,752,021 A | 5/1998 | Nakatsuyama et al. | |
| 5,848,386 A | 12/1998 | Motoyama et al. | |
| 5,915,259 A | 6/1999 | Murata | |
| 5,920,879 A | 7/1999 | Kyojima et al. | |
| 5,948,058 A | 9/1999 | Kudoh et al. | |
| 6,009,436 A | 12/1999 | Motoyama et al. | |
| 6,012,075 A * | 1/2000 | Fein et al. | 715/256 |
| 6,014,680 A | 1/2000 | Sato et al. | |
| 6,031,625 A | 2/2000 | Sherman et al. | |
| 6,085,206 A * | 7/2000 | Domini et al. | 715/533 |
| 6,131,102 A * | 10/2000 | Potter | 715/533 |
| 6,202,072 B1 | 3/2001 | Kuwahara et al. | |
| 6,212,532 B1 | 4/2001 | Johnson et al. | |
| 6,424,983 B1 * | 7/2002 | Schabes et al. | 715/533 |
| 6,535,883 B1 * | 3/2003 | Lee et al. | 707/100 |
| 6,558,431 B1 * | 5/2003 | Lynch et al. | 715/513 |
| 6,611,802 B2 * | 8/2003 | Lewis et al. | 704/235 |
| 6,895,551 B1 * | 5/2005 | Huang et al. | 715/513 |
| 6,950,984 B2 * | 9/2005 | Hori et al. | 715/513 |
| 7,028,259 B1 * | 4/2006 | Jacobson | 715/531 |

(Continued)

FOREIGN PATENT DOCUMENTS

EP 1 004 968 A2 5/2000

(Continued)

OTHER PUBLICATIONS

Tyng-Ruey Chang, "Generic Validation of Structure Content with Parametric Modules," ICFP'01, Sep. 3-5, 2001, Florence, Italy, Copyright 2001 ACM 1-58113-415-0/01/0009, pp. 98-109.*

(Continued)

Primary Examiner—Laurie Ries
Assistant Examiner—Maikhanh Nguyen
(74) Attorney, Agent, or Firm—Fish & Richardson P.C.

(57) ABSTRACT

Computer-implemented methods and apparatus, including computer program products, implement techniques for validating and correcting structured electronic documents. The techniques include identifying a structural aspect of a structured electronic document that fails to conform to rules of a markup language format. One or more changes are suggested that would correct the identified structural aspect. User input is received selecting a change of the suggested changes. The selected change is applied to the structured electronic document. The rules are associated with the structured electronic document.

22 Claims, 5 Drawing Sheets

U.S. PATENT DOCUMENTS

| | | | |
|---|---|---|---|
| 7,036,072 B1 * | 4/2006 | Sulistio et al. | 715/517 |
| 7,054,924 B1 * | 5/2006 | Harvey et al. | 709/220 |
| 7,076,658 B2 * | 7/2006 | O'Neill | 713/176 |
| 7,111,076 B2 * | 9/2006 | Abjanic et al. | 709/246 |
| 7,146,422 B1 * | 12/2006 | Marlatt et al. | 709/227 |
| 7,149,966 B2 * | 12/2006 | Jones et al. | 715/234 |
| 7,200,805 B2 * | 4/2007 | Carlson et al. | 715/237 |
| 7,237,222 B1 * | 6/2007 | Nedbal et al. | 717/100 |
| 7,287,219 B1 | 10/2007 | Young et al. | |
| 2001/0032218 A1 * | 10/2001 | Huang | 707/513 |
| 2002/0002566 A1 | 1/2002 | Gajraj | |
| 2002/0120647 A1 * | 8/2002 | Amano | 707/501.1 |
| 2002/0143727 A1 * | 10/2002 | Hu et al. | 707/1 |
| 2002/0152244 A1 * | 10/2002 | Dean et al. | 707/530 |
| 2002/0156816 A1 * | 10/2002 | Kantrowitz et al. | 707/530 |
| 2002/0169803 A1 * | 11/2002 | Sampath et al. | 707/513 |
| 2003/0093677 A1 * | 5/2003 | Neill | 713/176 |
| 2003/0110279 A1 * | 6/2003 | Banerjee et al. | 709/232 |
| 2003/0167446 A1 * | 9/2003 | Thomas | 715/513 |
| 2003/0237047 A1 * | 12/2003 | Borson | 715/513 |
| 2003/0237048 A1 * | 12/2003 | Jones et al. | 715/513 |
| 2004/0002952 A1 * | 1/2004 | Lee et al. | 707/1 |
| 2004/0006744 A1 * | 1/2004 | Jones et al. | 715/514 |
| 2004/0093567 A1 * | 5/2004 | Schabes et al. | 715/533 |
| 2004/0177315 A1 * | 9/2004 | Brown et al. | 715/500 |
| 2004/0177321 A1 * | 9/2004 | Brown et al. | 715/513 |
| 2004/0205573 A1 * | 10/2004 | Carlson et al. | 715/513 |
| 2004/0268229 A1 * | 12/2004 | Paoli et al. | 715/508 |
| 2004/0268304 A1 * | 12/2004 | Kuo et al. | 717/109 |
| 2005/0149867 A1 * | 7/2005 | Freelander et al. | 715/533 |

FOREIGN PATENT DOCUMENTS

| | | | |
|---|---|---|---|
| EP | 1004968 A1 * | 5/2000 | |
| GB | 2 307 571 A | 5/1997 | |
| WO | 03/034228 * | 4/2003 | |
| WO | 03/060758 * | 7/2003 | |

OTHER PUBLICATIONS

Ya Bing Chen et al., "Designing Valid XML Views," ER 2002, LNCS 2503, Copyright Springer-Verlag Berlin Heidelberg 2002, pp. 463-477.*

Mark Nelson, "Validation with MSXML and XML Schema," Windows Developer Maganize, Jan. 2002, pp. 35-38.*

Yi Chen et al., "A Constraint Validator For XML," CIKM'02, Nov. 4-9, 2002, Copyright 2002 ACM 1-58113-492-4/02/0011, pp. 446-452.*

"A Simple XML Parser," C/C++ Users Journal, Jul. 1999, pp.22-32.*

S. Kim et al., "Immediate and Partial Validation Mechanisim for Conflict Resolution of Update Operations in XML Databases," Korea, 2002, pp. 387-396.*

C. Yoo et al., "Automatic Generation Algorithm of Uniform DTD for Structured Documents", Proceedings of the IEEE Region 10 Conference, Sep. 1999, pp. 1095-1098.*

A. Sahuguet, "Everything You Ever Wanted to Know About DTDs, But Were Afraid to Ask", WebDB Workshop, 2000, pp. 1.171-183.*

H. De'Jean, "Learning Syntactic Structures with XML", in Processings of CoNLL-2000, 2000, pp. 133-135.*

F. Bustamante et al., "GramCheck: A Grammar and Style Checker", pp. 1-7, No Dated.*

Wang et al. "An XML Typing Module for XML Schema Validation and XML Typing," Association for Computing Machinery, Inc., 2003.*

"Welcome to XMLSPY 2004 Enterprise Edition", http://www.altova.com/manual/Altova GmbH, 1998-2004, 10 pages.

Tim Bray et al., "Extensible Markup Language (XML) 1.0", (Second Edition), Review Version, W3C Recommendation, Oct. 6, 2000, 61 pages.

William W. Cohen, "Learning Rules that Classify E-Mail", AAAI Spring Symposium on Machine Learning in Information Access, 1996, 7 pages.

David C. Fallside (Ed.), "XML Schema Part 0: Primer", W3C Recommendation, May 2, 2001, 74 pages.

Minos Garofalakis et al., "XTRACT: A System for Extracting Document Type Descriptors from XML Documents", 2000, 29 pages.

Line Poullet et al., "Semantic Structuring of Documents", IEEE Information Technology, Jul. 4, 1997, pp. 118-124.

Ke Wang et al., "Discovering Typical Structures of Documents: A Road Map Approach", $21^{st}$ Annual ACM Conference on Research and Development in Information Retrieval, Aug. 1998, pp. 146-154.

Chun-Sik Yoo et al., "Automatic Generation Algorithm in Unfirm DTD for Structured Documents", TENCON 99, Proceedings of the IEEE Region 10 Conference, Sep. 15-17, 1999, pp. 1095-1098.

* cited by examiner

```
<?xml version="1.0"?>
<!DOCTYPE greeting SYSTEM "hello.dtd">
<greeting>HELLO, world!</greeting>
```
FIG._1
Prior Art
```
<?xml version="1.0" encoding="UTF-8" ?>
<!DOCTYPE greeting [
<!ELEMENT greeting (#PCDATA)>
]>
<greeting>Hello, world!</greeting>
```
FIG._2
Prior Art

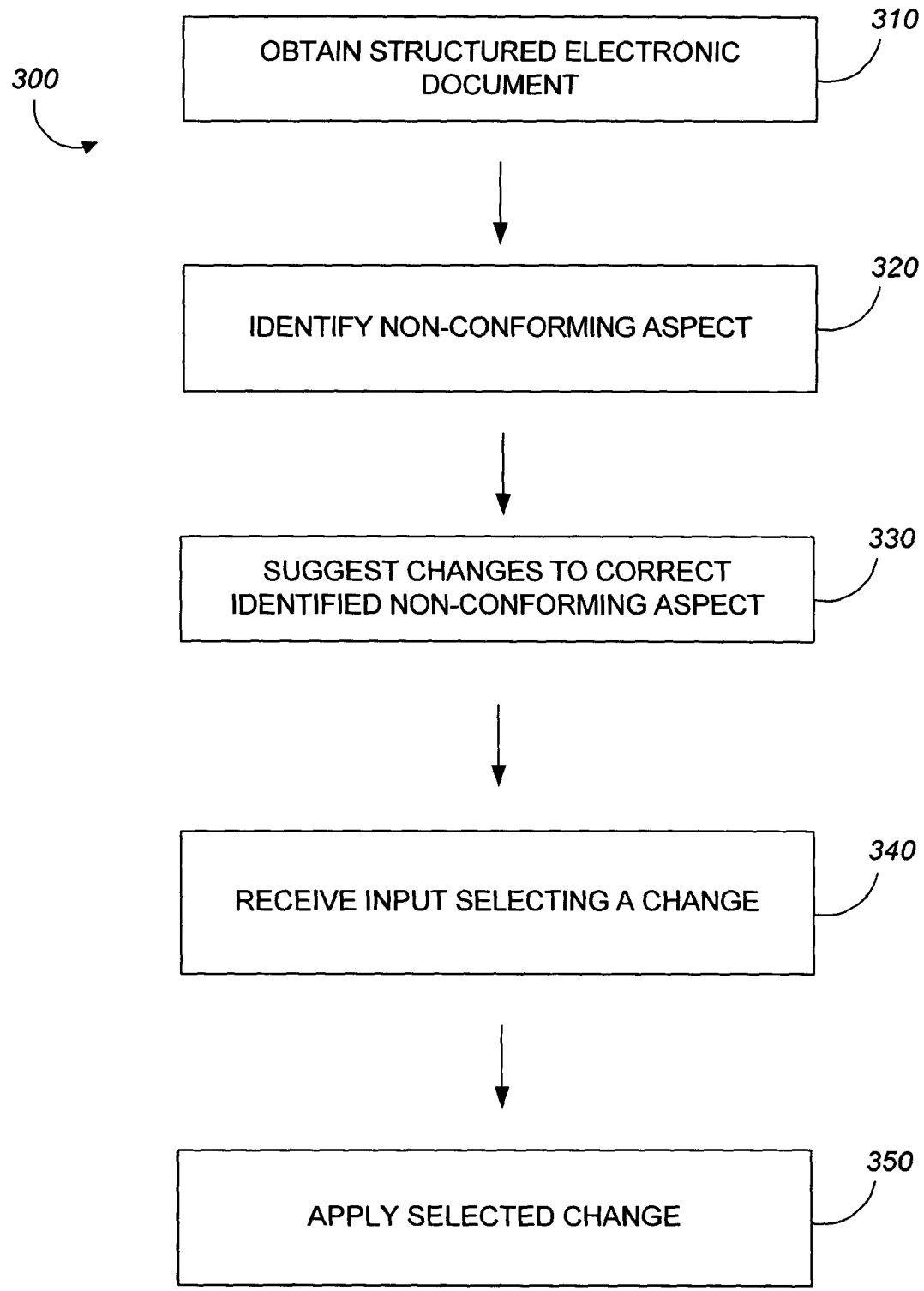
FIG._3

Hello, world!

FIG._4

<b>Hello,<i>world</b>!</i>

FIG._6

```xml
<?xml version='1.0'?>
<!-- A bookstore might use a file like this one to keep inventory -->
<bookstore>
        <book genre="autobiography">
                <title>The 1854 Oregon Trail Diary of Winfield Scott Ebey</title>
                <author>
                        <nationality>American</nationality>
                        <name>Winfield</name>
                        <name>Scott</name>
                        <name>Ebey</name>
                </author>
                <price>27.95</price>
        </book>
        <book genre="novel">
                <title>A Modest Proposal and Other Satirical Works</title>
                <author>
                        <nationality>Irish</nationality>
                        <name>Jonathan</name>
                        <name>Swift</name>
                </author>
                <price>1.50</price>
        </book>
        <book genre="philosophy">
                <title>Five Dialogues</title>
                <author>
                        <nationality>Greek</nationality>
                        <name>Plato</name>
                </author>
                <price>6.95</price>
        </book>
</bookstore>
```

FIG._5

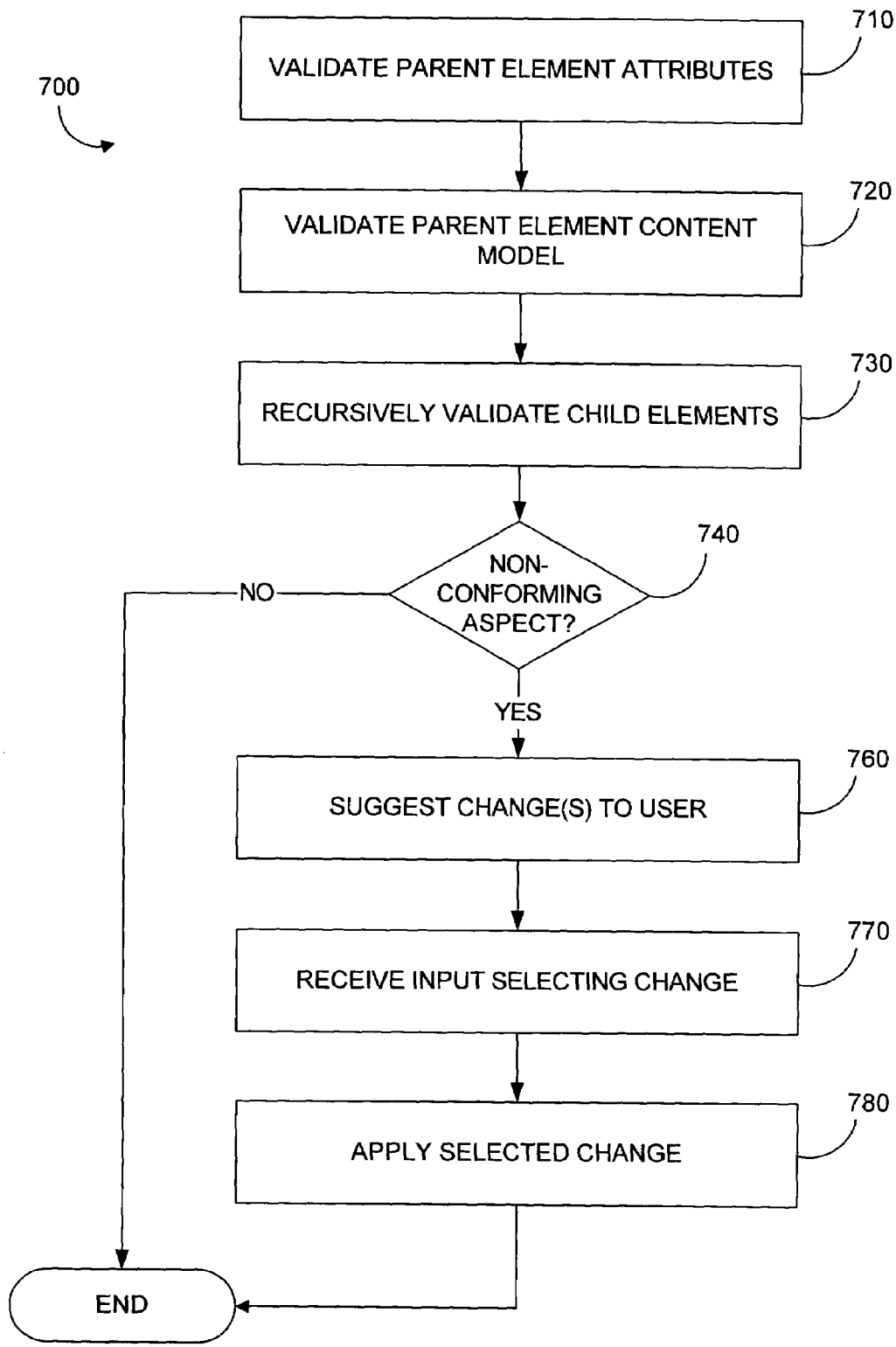
FIG._7

CORRECTING VALIDATION ERRORS IN STRUCTURED DOCUMENTS

BACKGROUND

The invention relates to correcting validation errors in structured electronic documents. A structured electronic document is an electronic document that includes content information, such as text characters, graphics, images, and the like, and structure information that defines how the content information is arranged and/or related in the document. The document structure can be specified according to a markup language format having one or more associated sets of rules that define what information is allowed in the document and in what order, so that the document can be understood by a computer. An electronic document that conforms to an associated set of rules is often said to be "well-formed" or "valid".

A structured electronic document can include data, representing structure and content, and metadata. Metadata may identify the type of the structured document, refer to a set of rules stored separately from the document, or may itself include a list of rules. The metadata can include version data and audit trails, author data and annotations, language data, workflow routing information, asset management information, configuration information, data source information, or any other kind of data describing the document as a whole. FIG. 1 illustrates a structured electronic document with metadata 110 referring to rules stored separately from the document. FIG. 2 illustrates a structured electronic document with metadata 210 itself including a list of rules.

Structured electronic documents are often arranged according to a hierarchical structure, in which child elements of structure and content are associated with parent elements. Labeling pieces of document content is useful to allow a human or computer to understand the significance of the content. Associating child elements of structure and content with parent elements is useful to allow a human or computer to understand the relation of the child elements to each other.

The logical structure of a structured electronic document can be explicitly indicated in the document by "markup", which consists of tags, references, delimiters and the like, that are inserted into the content of the document and that specify the logical components of the document. Markup in a structured electronic document is typically specified according to a markup language. For example, the eXtensible Markup Language (XML) is a markup language that can be used to describe hierarchically-structured electronic documents. See Extensible Markup Language (XML) 1.0 (Second Edition), T. Bray, et al. (eds.), Oct. 6, 2000 www.w3.org/TR/2000/REC-xml-20001006 ("The XML specification"). The XML specification itself defines a set of rules with which XML documents are expected to conform. Additional rules for a given document or set of documents can be specified in a SGML or XML document type definition (DTD) or XML schema.

The process of determining whether a document conforms to an associated set of rules is known as validation. For XML or SGML documents, this can include determining whether the document is "well-formed"—that is, whether the document conforms to the rules set out in the appropriate specification (and is therefore a legal markup language document)—and whether the document is "valid", conforming to the rules specified by a document type definition or schema associated with the document. If a document fails to conform to a set of rules, it is because at least one aspect of the document fails to conform to at least one rule. A computer program validating a document may inform a user of the non-conforming aspect, and of the rule that is violated, so that the user has the necessary information to devise a correction for the document.

Electronic data are often stored in structured electronic documents to make programmatic reading, writing, and searching the data easier and more efficient, but users must be careful when editing structured electronic documents by hand to follow the rules associated with the documents. It may be easy for a computer reading a structured electronic document to alert a user when an aspect of a document's structure fails to conform to all the rules. But even if the computer specifies both the non-conforming aspect of the document and the rule which triggered the alert, the document or the rules may be too complicated for the user to understand and correct the error herself. If the user is able to understand and correct the error, it may be wastefully time-consuming for her to do so.

SUMMARY

The invention features computer-implemented techniques for correcting aspects of structured electronic documents that do not conform with applicable structural rules. In general, in one aspect, the invention provides computer-implemented methods and apparatus, including computer program products, implementing techniques for validating and correcting structured electronic documents. The techniques include identifying a structural aspect of a structured electronic document that fails to conform to rules of a markup language format, suggesting one or more changes to a user which would correct the identified structural aspect, receiving user input selecting a change of the suggested changes, and applying the selected change to the structured electronic document. The rules are associated with the structured electronic document.

Particular implementations can include one or more of the following features. Identifying a structural aspect of the structured electronic document can include identifying a missing, extraneous, misplaced, or mismatched structural aspect of the structured electronic document. The rules can include rules stored in the structured electronic document, rules stored separately from and referred to in the structured electronic document, and/or rules deduced from the structure of the structured electronic document. The markup language format can be an XML format. The rules can include rules represented as an XML document type definition or schema.

Suggesting changes to the user can include suggesting a plurality of changes to the user in an order determined by predefined user preferences, or by a calculated statistical likelihood of correctness. Suggesting changes to the user can include requesting information from a user about the identified structural aspect, and based on input received in response to the request, suggesting to the user one or more changes that would correct the identified structural aspect.

Identifying a structural aspect of the structured electronic document that fails to conform to rules associated with the structured electronic document can include identifying one or more structural aspects of the structured electronic document that fail to conform to rules associated with the document. Receiving user input selecting a change of the suggested changes can include receiving user input selecting one or more suggested changes. Applying the selected change includes can include applying the selected changes to the structured electronic document, thereby bringing the entire structured electronic document into conformance with the rules.

In general, in another aspect, the invention provides computer-implemented methods and apparatus, including computer program products, implementing techniques for validating and correcting a markup language document. The techniques include recursively validating a parent element of the markup language document by validating attributes of the parent element, validating a content model of the parent element, and recursively validating one or more children of the parent element. A structural aspect of the markup language document is identified that fails to conform to rules associated with the markup language document. One or more changes are suggested to a user that would correct the identified structural aspect. User input is received selecting a change of the suggested changes. The selected change is applied to the document.

Particular implementations can include one or more of the following features. The markup language document can be an XML document. The techniques can include checking a root element against a DOCTYPE root tag specified in the rules associated with the XML document, and allowing a user to retag the root element using the DOCTYPE root tag.

The invention can be implemented to provide one or more of the following advantages. Suggesting changes by which non-conforming aspects can be corrected makes it easier for the user of a structured electronic document to bring the document into conformance without requiring a time-consuming understanding of document rules and validation errors. Allowing the user to select from the suggested changes, and automatically applying the selected change, makes it easier for the user to edit the structured electronic document by not requiring the user to think about low-level details. Interactively requesting additional information from the user and suggesting changes makes it easier for the user to make complex corrections that are beyond total automation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 illustrates a structured electronic document in an XML format with metadata referring to rules stored separately from the document.

FIG. 2 is an XML document with metadata itself containing a list of rules.

FIG. 3 is a flow diagram illustrating a method of validating and correcting a structured electronic document according to rules of a markup language format one aspect of the invention.

FIG. 4 is an XML document with no express rules.

FIG. 5 is a more complex XML document with no express rules.

FIG. 6 is a document that fails to conform to HTML rules.

FIG. 7 is a flow diagram illustrating a method of recursively validating and correcting a markup language document.

Like reference symbols in the various drawings indicate like elements.

DETAILED DESCRIPTION

FIG. 3 is a flowchart illustrating a computer-implemented method 300 for correcting structured electronic documents. The method can be implemented by a validation program executing on a computer hosting the structured electronic document. The validation program can be a stand alone application, or a module or subunit of another computer program application, such as a document management, viewing or authoring application. According to method 300, a validation program obtains a structured electronic document (step 310), and identifies an aspect of the document that fails to conform to a set of rules (step 320). The validation program suggests one or more changes that would correct the identified, non-conforming aspect of the document (step 330). The validation program then receives user input selecting one or more of the suggested changes (step 340), and applies the selected change to the structured electronic document (step 350).

The structured electronic document can be obtained from any computer-readable medium, such as disk, tape, semiconductor memory, or a network. The structured electronic document can contain any kind of data for any purpose, and has a logical structure specified by markup according to a markup language. In particular implementations, the markup language can be SGML or XML, although other markup languages can be used. The structured electronic document does not necessarily correspond to a file, but may be stored in a portion of a file that holds other documents, in a single file dedicated to the document in question, or in multiple coordinated files. Unless otherwise noted, the word "document" is used in this specification to mean "structured electronic document".

The structured electronic document can have one or more associated sets of rules specifying what data are allowed in the document and in what order. The rules can be internal (e.g., stored in the document itself) or external (e.g., stored separately and referred to in the document or by a binder, which is a third document that binds the rules to the document without a specific reference in the document), and can be express (e.g., expressed as a document type definition or a schema) or implied (e.g., deduced from the structure of the document). As noted above, FIG. 2 illustrates a structured electronic document that includes a set of rules stored in the document itself. The rules for the document are stored in the document type declaration. The document contains one "greeting" element, and the content for the element is parsed character data. As also noted above, FIG. 1 illustrates a structured electronic document wherein the rules are stored separately from the document at the address "hello.dtd" and referred to by the document type declaration in the document.

The rules can be expressed in any format that can be read and applied by a validation program, such as an XML processor, and can include rules expressed in a format that allows the user to declare hierarchical structure, such as an XML or SGML DTD, or an XML schema. Some of the rules can be provided by an established standard, such as the XML specification.

The rules for a markup language may describe, for example, which elements are allowed in a document, which elements are allowed to contain which other elements and in what order, which attributes an element is allowed to have, how many times an element is allowed or required in another element, the data type of an element's content or attributes, an element's possible content or attribute values, how an element's content or attribute values may be aggregated, whether an element is allowed to be empty or nil, any uniqueness requirements for an element's content or attributes, or whether an element may contain content and other elements mixed together.

FIG. 4 illustrates a structured electronic document with no express rules. It is possible to deduce some rules from the structure of the document, namely, that the document contains one "greeting" element and the content for the element is parsed character data. FIG. 5 is a more complex example of a document with no explicit associated rules. Techniques for deducing document type rules from structured documents are described, for example, in U.S. patent application Ser. No. 09/266,680, filed on Mar. 11, 1999, which is incorporated by reference herein. See also, e.g., XTRA CT: A System for Extracting Document Type Descriptors from XML Documents, M. Garofalakis, et al., Proceedings of the 2000 ACM SIGMOD international conference on management of data (2000) pages 165-176, and reference cited therein.

The validation program identifies aspects of the document that fail to conform to the rules by validating the document against the rules. In one implementation, the validation program iterates through each element in the document's hierarchical structure, and validates the element against the associated rules. In XML implementations, for example, the validation program can be implemented as a validating XML processor that reads every piece of a subject document, and reports all violations of well-formedness and validity contraints. Before the validation starts, the validation program builds a deterministic finite automaton from the content model defined in the document type definition, as described, for example, in Appendix E of the XML specification. This finite state machine is used to validate the document, starting at the root element, and recursively traversing the structure. An XML document conforms to an associated set of rules if the attributes, child elements, and content of each element conform to the element's attribute list declaration, content model, and associated content rules. The attributes of an element can be validated with a dictionary of name-value pairs.

If a document fails to conform to a set of rules, it is because at least one aspect of the document fails to conform to at least one rule. Therefore, a document may have more than one aspect failing to conform to a rule, or it may have an aspect failing to conform to a plurality of rules. There may be more than one correction that would bring a document into conformance. The document may fail to conform to the rules because data is missing, misplaced, extraneous, or mismatched. Data may be missing, for example, if a required attribute or element is missing, or if an element is empty or nil when the rules specify that it should not be. Data may be misplaced, for example, if an element occurs out of sequence, or if an element's attributes and content conform to the rules but the element is not allowed to be where it is in the document. Data may be extraneous, for example, if an element contains a disallowed attribute, if an element occurs more times than allowed, or if a uniqueness constraint is violated. Data may be mismatched, for example, if an element should be retagged, if start and end tags don't nest or match, if an element's content or attribute values don't match the allowed values, or if an element should not contain content and elements mixed together.

To aid the user in correcting the document, for each identified, non-conforming aspect of the document the validation program suggests one or more corrections that would correct the identified, non-conforming aspect. In the case of a markup language document, such suggestions can include, for example, deleting elements or attributes, setting attributes to default values, deleting an element's content, or retagging an element. Other suggestions may require further user input; such suggestions can include, for example, moving data, inserting data, or deleting data. The user can be prompted for further information to allow the validation program to make better suggestions or more definite suggestions. For example, if the validation program sees a validated element with validated child elements and content, but the element is not permitted in its current location, the user can be prompted for a new location for the element. Or, if an element is missing a child element that has required attributes, the validation program can prompt the user for the attribute values. The program can be configured to select and apply suggestions automatically. The program can select and apply suggestions automatically for some aspects or for all aspects (for example, if only one correction is possible for a particular non-conforming aspect). The process of correcting the document can continue until the document conforms to all of the associated rules.

In some implementations, the validation program need not identify every non-conforming aspect of the document, or suggest corrections for every identified non-conforming aspect. Likewise, not every non-conforming aspect must be corrected in order for the document to be understood by a host computer system. For example, in some cases a computer may be able to understand some documents that do not conform to an associated set of rules. FIG. 6 illustrates one such document, an HTML document that breaks at least one rule in the HTML standard (the rule that tags must be nested), but that can still be understood by some web browsers.

The validation program can display a description of the identified non-conforming aspects to the user. For example, the validation program can store a predetermined error string for each of a plurality of kinds of validation errors. When a non-conforming aspect of a particular type is identified, the validation program can retrieve the corresponding error string for presentation to the user, optionally in combination with suggested corrections as will be discussed in more detail below. Similarly, the validation program can store a set of mappings from particular kinds of validation errors to appropriate corrections.

The suggestions can be presented to the user as a list of corrections associated with each identified non-conforming aspect. A list identifying every non-conforming aspect and the corresponding suggestions can be presented at one time, e.g., after the validation program has parsed the entire document. Alternatively, a list of corrections can be presented for each non-conforming aspect during the parsing process as the aspect is identified. The list can be arranged in an order determined automatically (e.g., according to a calculated statistical likelihood of correctness) or according to user preferences (e.g., preferences specified by the user for the particular document or computer program application). The user preferences can include, for example, ranking particular corrections higher than other corrections (e.g., ranking "setting attributes to default values" higher than "deleting attributes"). A calculated statistical likelihood of correctness can include, for example, a metric of error distance similar to that used in an conventional spell checker algorithm.

The suggestions for a particular aspect can be stored as a set, eliminating duplicates. The suggestions are presented to the user either together (e.g., in a list or as radio buttons) or individually (e.g., as a preview window allowing the user to cycle through possible changes). The user can be allowed to make her own changes, even if those changes are not part of the set of suggestions. Suggestions can be stored in the document with the aspects or separately from the aspects in an arbitrary location. The validation program can contain suggestion templates for each kind of validation error. When a validation error (i.e., non-conforming aspect) is identified, the validation program uses a template to indicate to the user the exact aspect of the structured electronic document that fails to conform to the rules, and to suggest corrections that are predefined in the template for the particular kind of validation error. The template can also include logic necessary to implement the specific changes to the document to correct the identified aspect. For example, the template can be implemented as a list of commands to the validation program, as recognition and replacement patterns, or as an integral part of the validation program. The templates can be general and shared across rules. For instance, there may be a template to insert elements, a template to delete elements, and a template to retag elements. The same template can be invoked twice with different arguments for the same aspect.

FIG. 7 is a flow diagram illustrating one implementation of a computer-implemented method 700 for correcting structured electronic documents. Some markup language documents have the property that a document conforms to an associated set of rules if the attributes and content model of each element conform to the set of rules. Such markup language documents can be validated by recursion over the hierarchical structure: After checking a parent element's attributes (step 710) and content model (step 720), each of the parent element's children, if any, are then checked in the same way (step 730). The recursive process continues to the parent element's grandchildren, if any, and great-grandchildren, if any, and any other descendant elements. If any aspects are found that fail to conform to the rules (the "YES" branch of decision 740), one or more changes are suggested to the user (step 750), input is received from the user selecting a change (step 760), and the selected change is applied to the structured electronic document (step 770).

One implementation of a process of detecting non-conforming aspects of a structured (XML) document and suggesting appropriate corrections is illustrated by the pseudocode set out in the following Code Listing. Before the validation starts, a deterministic finite state automaton is built, as discussed above. This finite state machine is used to validate the content models. Validation starts at the root element, and the structure is traversed recursively. The Code Listing implements attribute validation.

Child element validation is performed in one implementation by the following process: If an element declared as empty has child elements, an "empty element with content" error is posted and a suggestion is made to delete the child elements. If the content model does not allow the next child element to follow the current child element, an "unexpected element" error is posted and several suggestions are made. First, suggestions are made to retag the offending next child as an allowable next child. Second, suggestions are made to insert allowable intervening child elements. Third, a suggestion is made to delete the offending next child. If the child elements validate but the content model requires additional child elements, a "missing element" error is posted and suggestions are made to insert the required child elements.

Content validation is performed in one implementation by the following process: If an element declared as "empty" has content other than whitespace, an "empty element with content" error is posted and a suggestion is made to delete the element's content. If an element is declared as having only children and no content, but the element has content other than whitespace, a "children content model with content" error is posted and a suggestion is made to delete the element's content.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

Code Listing:

```
look for the declared attribute in the attribute dictionary
if attribute is not found
    if attribute declaration's default value type is #REQUIRED
        if the attribute is not in the missing attributes list
            post missing required attribute error
            suggest inserting the attribute
            add the attribute to the missing attributes list
    else if attribute is not validated yet
        if attribute default value type is #FIXED
            if attribute value does not match default value
                post fixed attribute default error
                suggest setting the attribute value to the declared
                    default value
        else switch (attribute type)
```

```
case CDATA
    (nothing needs to be checked)
case ID
    break the attribute value down into tokens
    if more than one token or no tokens
        post invalid name token error
    for each token in the value
        if the token is a valid ID and is not in
    use
            suggest set attribute value to this
            token
        suggest delete attribute if it is not required
    else
        if token is not a valid tag
            post invalid name token error
            suggest delete attribute if it is not
    required
        if another element has the same ID
            post duplicate ID attribute value error
            suggest delete attribute if it is not
            required
case IDREF
    break the attribute value down into tokens
    if more than one token or no tokens or the single
    token is not a valid IDREF
        post invalid name token error
        get the list of all IDs currently in use
        for each ID
            if ID is a valid ID name
                suggest setting the attribute value
                to the ID
            suggest delete attribute if it is not required
    else if ID is not found in an element
        post ID not found error
        get the list of all IDs currently in use
        for each ID
            if ID is a valid ID name
                suggest setting the attribute value
                to the ID
            suggest delete attribute if it is not required
case IDREFS
    break the attribute value down into tokens
    if no tokens
        post invalid ID name error
        get the list of all IDs currently in use
        for each ID
            if ID is a valid ID name
                suggest setting the attribute value
                to the ID
        suggest delete the attribute if not required
    else
        for each token in the list
            if token does not match Name production
                post invalid ID name error
                if there is more than one token
                    suggest setting attribute
                    value to not contain this ID
                suggest delete attribute if it is
                not required
                break
            if token/ID is not found in an element
                post ID not found error
                if there is more than one token
                    suggest setting attribute
                    value to not contain this ID
                suggest delete attribute if it is
                not required
                break
case ENTITY
    break the attribute value down into tokens
    if more than one token or no tokens or a single
    invalid token
        post invalid name token error
        for each unparsed entity in the DTD
            suggest setting the attribute value to
            the entity
            suggest delete attribute if it is not
            required
    else
        if the unparsed entity is not found
            post not unparsed entity in attribute
        value error
            for each unparsed entity in the DTD
                suggest setting the attribute value
                to the entity
            suggest delete attribute if it is not
            required
case ENTITIES
    break the attribute value down into tokens
    if no tokens
        post invalid entity name error
        for each unparsed entity in the DTD
            suggest setting the attribute value to
            the entity
        suggest delete attribute if it is not required
    else for each token
        if unparsed entity is not found or entity not
    unparsed entity
            post not unparsed entity in attribute
        value error
                suggest setting the attribute value to
                not include this token
            suggest delete attribute if it is not
            required
            break
case NMToken
    break the attribute value down into tokens
    if more than one token or no tokens or single token
    not valid NMToken
        post invalid NMToken error
    for each token in the value
        if token is valid NMToken
            suggest setting attribute to token
        suggest delete attribute if it is not required
case NMTokens
    break the attribute value down into tokens
    if no tokens
        post invalid NMToken error
        suggest delete attribute if it is not required
    else for each token
    if not NMToken
            post invalid NMToken error
            if more than one token
                suggest setting attribute value to
                not include the token
                suggest delete attribute if it is
                not required
case Notation
    break the attribute value down into tokens
    if more than one token or no tokens
        post invalid notation name error
        for each value in the declared enumeration
            if value is a notation
                suggest setting attribute value to
                tbe notation
            suggest delete attribute if it is not required
    else
        if cannot find attribute value in the attribute
        declaration's enumerated list
            post attribute value not in enumeration
        error
            for each value in the declared
        enumeration
                if value is a notation
                    suggest setting attribute
                    value to the notation
                suggest delete attribute if it is not
                required
        else if cannot find the notation
            post undeclared notation error
            for each value in the declared
        enumeration
                if value is a notation
                    suggest setting attribute
                    value to the notation
                suggest delete attribute if it is not
                required
case Enumerated
```

-continued

```
        break the attribute value down into tokens
        if more than one token or no tokens
            post attribute value no in enumeration error
            for each value in the declared enumeration
                suggest setting attribute value to value
            suggest delete attribute if it is not required
        else
            if cannot find attribute value in the attribute
            declaration's enumerated list
                post attribute value not in enumerated
                list error
                for each value in the declared
                enumeration
                    suggest setting attribute value to
                    value
                suggest delete attribute if it is not
                required
```

What is claimed is:

1. A computer-implemented method for correcting an XML electronic document, the XML electronic document having a structure, the method comprising:

identifying a validation error in the XML electronic document structure, the validation error being an aspect of the XML electronic document structure that fails to conform to rules of an XML document type definition or an XML schema, the rules being associated with the XML electronic document, the validation error being of a particular kind, wherein identifying the validation error includes building a deterministic finite automation from a content model defined in a document type definition of the XML electronic document and identifying the validation error using the deterministic finite automaton;

selecting a suggestion template from among multiple suggestion templates according to the particular kind of the validation error, and using the selected suggestion template to suggest to a user suggested corrections that are predefined in the template for the particular kind of validation error, the selected suggestion template including logic necessary for modifying the XML electronic document structure in conformance with the rules of the XML document type definition or the XML schema, wherein modifying the XML electronic document structure comprises retagging an element in the XML electronic document structure and moving an element from a current location to a new location in the XML electronic document structure;

receiving an input selecting one of the suggested corrections; and using the logic in the selected suggestion template to apply the correction selected by the input to the XML electronic document.

2. The method of claim 1, wherein:
identifying an aspect of the XML electronic document structure includes identifying a missing, extraneous, misplaced, or mismatched structural aspect of the XML electronic document.

3. The method of claim 1, wherein:
suggesting changes to the user includes suggesting a plurality of changes to the user in an order determined by predefined user preferences, the predefined user preferences including ranking particular changes higher than other changes.

4. The method of claim 1, wherein suggesting one or more changes to a user comprises:
requesting information from a user about the identified structural aspect; and based on input received in response to the request, suggesting to the user one or more changes that would correct the identified structural aspect.

5. The method of claim 1, wherein:
identifying an aspect of the XML electronic document structure that fails to conform to rules associated with the XML electronic document includes identifying one or more structural aspects of the XML electronic document that fail to conform to the rules associated with the document; and applying the correction selected by the input includes applying the correction selected by the input to the XML electronic document, thereby bringing the entire XML electronic document into conformance with the rules.

6. The method of claim 1, wherein:
the template is implemented as a list of commands.

7. A computer-implemented method for validating and correcting an XML electronic document, the XML electronic document having a structure, the method comprising:

recursively validating a parent element of the XML document structure by:
validating attributes of the parent element,
validating a content model of the parent element, and
recursively validating one or more children of the parent element;

identifying a validation error in the XML electronic document, the validation error being an aspect of the XML electronic document structure that fails to conform to one or more rules of an XML document type definition or an XML schema, the rules being associated with the XML electronic document, the validation error being of a particular kind, wherein identifying the validation error comprises building a deterministic finite automaton from a content model defined in a document type definition of the XML electronic document and identifying the validation error using the deterministic finite automaton;

selecting a suggestion template from among multiple suggestion templates according to the particular kind of the validation error, and using the selected suggestion template to suggest to a user suggested corrections that are predefined in the template for the particular kind of validation error, the selected suggestion template including logic necessary for modifying the XML electronic document structure in conformance with the rules of the XML document type definition or the XML schema, wherein modifying the XML electronic document structure comprises retagging an element in the XML electronic document structure and moving an element from a current location to a new location in the XML electronic document structure;

receiving an input selecting one of the suggested corrections; and using the logic in the selected suggestion template to apply the correction selected by the input to the XML electronic document.

8. The method of claim 7, further comprising:
checking a root element against a DOCTYPE root tag specified in the rules associated with the XML document; and allowing a user to retag the root element using the DOCTYPE root tag.

9. The method of claim 7, wherein:
the template is implemented as a list of commands.

10. A computer program product tangibly embodied in a machine-readable storage device for correcting an XML electronic document, the XML electronic document having a structure, the product comprising instructions operable to cause one or more data processing apparatus to perform operations comprising:

identifying a validation error in the XML electronic document structure, the validation error being an aspect of the XML electronic document structure that fails to conform to rules of an XML document type definition or an XML schema, the rules being associated with the XML electronic document, the validation error being of a particular kind, wherein identifying the validation error comprises building a deterministic finite automaton from a content model defined in a document type definition of the XML electronic document and identifying the validation error using the deterministic finite automaton;

selecting a suggestion template from among multiple suggestion templates according to the particular kind of the validation error, and using the selected suggestion template to suggest to a user suggested corrections that are predefined in the template for the particular kind of validation error, the selected suggestion template including logic necessary for modifying the XML electronic document structure in conformance with the rules of the XML document type definition or the XML schema, wherein modifying the XML electronic document structure comprises retagging an element in the XML electronic document structure and moving an element from a current location to a new location in the XML electronic document structure;

receiving an input selecting one of the suggested corrections; and using the logic in the selected suggestion template to apply the correction selected by the input to the XML electronic document.

11. The computer program product of claim 10, wherein:

identifying an aspect of the XML electronic document structure includes identifying a missing, extraneous, misplaced, or mismatched structural aspect of the XML electronic document.

12. The computer program product of claim 10, wherein:

suggesting changes to the user includes suggesting a plurality of changes to the user in an order determined by predefined user preferences, the predefined user preferences including ranking particular changes higher than other changes.

13. The computer program product of claim 10, wherein suggesting one or more changes to a user comprises:

requesting information from a user about the identified structural aspect; and based on input received in response to the request, suggesting to the user one or more changes that would correct the identified structural aspect.

14. The computer program product of claim 10, wherein:

identifying an aspect of the XML electronic document structure that fails to conform to rules associated with the XML electronic document includes identifying one or more aspects of the XML electronic document structure that fail to conform to rules associated with the document; and applying the correction selected by the input includes applying the correction selected by the input to the XML electronic document, thereby bringing the entire XML electronic document structure into conformance with the rules.

15. The computer program product of claim 10, wherein: the template is implemented as a list of commands.

16. A computer program product tangibly embodied in a machine-readable storage device for validating and correcting an XML electronic document, the XML document having a structure, the product comprising instructions operable to cause one or more data processing apparatus to perform operations comprising:

recursively validating a parent element of the XML document structure by:

validating attributes of the parent element, validating a content model of the parent element, and recursively validating one or more children of the parent element;

identifying a validation error in the XML electronic document, the validation error being an aspect of the XML electronic document structure that fails to conform to one or more rules of an XML document type definition or an XML schema, the rules being associated with the XML electronic document, the validation error being of a particular kind, wherein identifying the validation error comprises building a deterministic finite automaton from a content model defined in a document type definition of the XML electronic document and identifying the validation error using the deterministic finite automaton;

selecting a suggestion template from among multiple suggestion templates according to the particular kind of the validation error, and using the selected suggestion template to suggest to a user suggested corrections that are predefined in the template for the particular kind of validation error, the selected suggestion template including logic necessary for modifying the XML electronic document structure in conformance with the rules of the XML document type definition or the XML schema, wherein modifying the XML electronic document structure comprises retagging an element in the XML electronic document structure and moving an element from a current location to a new location in the XML electronic document structure;

receiving input selecting one of the suggested corrections; and using the logic in the selected suggestion template to apply the correction selected by the input to the XML electronic document.

17. The computer program product of claim 16, further comprising instructions operable to cause one or more data processing apparatus to perform operations comprising:

checking a root element against a DOCTYPE root tag specified in the rules associated with the XML document; and allowing a user to retag the root element using the DOCTYPE root tag.

18. The computer program product of claim 16, wherein: the template is implemented as a list of commands.

19. A system, comprising:

a device hosting an electronic document application; and a processor configured to perform operations comprising:

identifying a validation error in the XML electronic document, the XML electronic document having a structure, the validation error being an aspect of the XML electronic document structure that fails to conform to rules of an XML document type definition or an XML schema, the rules being associated with the XML electronic document, the validation error being of a particular kind, wherein identifying the validation error includes building a deterministic finite automaton from a content model defined in a document type definition of the XML electronic document and identifying the validation error using the deterministic finite automaton;

selecting a suggestion template from among multiple suggestion templates according to the particular kind of the validation error, and using the selected suggestion template to suggest to a user suggested corrections that are predefined in the template for the particular kind of validation error, the selected suggestion template including logic necessary for modifying the XML electronic document structure in conformance with the rules of the XML document type definition or the XML schema, wherein modifying the XML electronic document structure comprises retagging an element in the XML electronic document structure and moving an element from a current location to a new location in the XML electronic document structure;

receiving an input selecting one of the suggested corrections; and using the logic in the selected suggestion template to apply the correction selected by the input to the XML electronic document.

20. The system of claim 19, wherein:

identifying an aspect of the XML electronic document structure includes identifying a missing, extraneous, misplaced, or mismatched structural aspect of the XML electronic document structure.

21. The system of claim 19, wherein:

suggesting changes to the user includes suggesting a plurality of changes to the user in an order determined by predefined user preferences, the predefined user preferences including ranking particular changes higher than other changes.

22. The system of claim 19, wherein:

the template is implemented as a list of commands.

* * * * *

UNITED STATES PATENT AND TRADEMARK OFFICE
CERTIFICATE OF CORRECTION

PATENT NO. : 7,657,832 B1 Page 1 of 1
APPLICATION NO. : 10/665156
DATED : February 2, 2010
INVENTOR(S) : William Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 579 days.

Signed and Sealed this

Thirtieth Day of November, 2010

David J. Kappos
*Director of the United States Patent and Trademark Office*